United States Patent
Knee et al.

(10) Patent No.: US 10,687,076 B2
(45) Date of Patent: Jun. 16, 2020

(54) REFINING MOTION VECTORS IN VIDEO MOTION ESTIMATION

(71) Applicant: Snell Advanced Media Limited, Newbury (GB)

(72) Inventors: Michael James Knee, Petersfield (GB); Martin Weston, Petersfield (GB)

(73) Assignee: GRASS VALLEY LIMITED, Newbury, Berkshire (GB)

(*) Notice: Subject to any disclaimer, the term of this patent is extended or adjusted under 35 U.S.C. 154(b) by 23 days.

(21) Appl. No.: 15/903,385

(22) Filed: Feb. 23, 2018

(65) Prior Publication Data

US 2018/0184115 A1 Jun. 28, 2018

Related U.S. Application Data

(63) Continuation of application No. 14/275,288, filed on May 12, 2014, now abandoned.

(30) Foreign Application Priority Data

May 13, 2013 (GB) .................................. 1308583.2

(51) Int. Cl.
*H04N 7/12* (2006.01)
*H04N 5/14* (2006.01)
*H04B 1/66* (2006.01)
*G06T 7/20* (2017.01)
*H04N 19/56* (2014.01)

(52) U.S. Cl.
CPC .................................. *H04N 19/56* (2014.11)

(58) Field of Classification Search
CPC ....... H04N 19/56; H04N 19/521; H04N 5/144
USPC ...................................................... 375/240
See application file for complete search history.

(56) References Cited

U.S. PATENT DOCUMENTS

| | | | | |
|---|---|---|---|---|
| 4,890,160 A | * | 12/1989 | Thomas | H04N 5/145 348/429.1 |
| 6,345,106 B1 | * | 2/2002 | Borer | G06T 7/269 356/27 |
| 2003/0067988 A1 | | 4/2003 | Kim et al. | |
| 2005/0259738 A1 | * | 11/2005 | Horishi | G06T 3/4007 375/240.16 |
| 2009/0168887 A1 | | 7/2009 | Lin | |
| 2009/0263033 A1 | * | 10/2009 | Weston | G06T 3/4007 382/236 |
| 2011/0043706 A1 | * | 2/2011 | Van Beek | G06T 7/0002 348/699 |
| 2012/0075535 A1 | * | 3/2012 | Van Beek | H04N 5/145 348/699 |

OTHER PUBLICATIONS

Search report from priority application No. GB1308583.2 dated Oct. 31, 2013.

* cited by examiner

*Primary Examiner* — Susan E. Hodges
(74) *Attorney, Agent, or Firm* — Arent Fox LLP

(57) ABSTRACT

In video motion estimation an initial candidate motion vector is generated for each block and a vector error is determined as for example a DFD. Spatial gradients of pixel values are calculated and used to refine the initial candidate motion vector. The relative contribution of the spatial gradients to the refinement process depends on the vector error.

16 Claims, 4 Drawing Sheets

REFINING MOTION VECTORS IN VIDEO MOTION ESTIMATION

CROSS-REFERENCE TO RELATED APPLICATION

This application is a continuation application of U.S. patent application Ser. No. 14/275,288, filed May 12, 2014 claims the benefit of Great Britain Application No. GB 1308583.2, filed May 13, 2013, the entire disclosure of which is hereby incorporated by reference.

FIELD OF INVENTION

This invention concerns motion estimation of video signals.

BACKGROUND OF THE INVENTION

This invention concerns the estimation of motion vectors between video frames in a sequence of frames. Motion vectors are assigned to pixels, or blocks of pixels, in each frame and describe the estimated displacement of each pixel or block in a next frame or a previous frame in the sequence. In the following description, the motion estimation is considered to be "dense" meaning that a motion vector is calculated for every pixel. The definition of "dense" may be widened to cover the calculation of a motion vector for each small block in the picture or for each pixel in a subsampled version of the picture. The invention can be applied with trivial modification to these wider cases.

The term motion estimation is used in this specification to include the estimation of displacement that is not only the result of motion but may also arise from the differences between two images.

Motion estimation has application in many image and video processing tasks, including video compression, motion compensated temporal interpolation for standards conversion or slow-motion synthesis, motion compensated noise reduction, object tracking, image segmentation, and stereoscopic 3D analysis and view synthesis from multiple cameras.

Some of the terminology used in describing motion estimation systems will now be described. FIG. 1 shows one-dimensional sections through two successive frames in a sequence of video frames, referred to as the previous or reference frame (101) and the current frame (102). A motion vector (104) is shown assigned to a pixel (103) in the current frame. The motion vector indicates a point (105) in the reference frame which is the estimated source of the current frame pixel (103) in the reference frame. This example shows a backward vector. Forward vectors may also be measured, in which case the reference frame is the next frame in the sequence rather than the previous frame.

An example of an algorithm that calculates motion vectors for pixels is given in WO 87/05769. The principle of this algorithm is summarised in FIG. 2. The current frame (201) and the previous frame (202) are applied to a phase correlation unit (203) which calculates a "menu" consisting of a number (three in this example) of candidate motion vectors (204). Each candidate vector controls a respective one of a set of shift units (205) which, for every pixel in the current frame, displaces the previous frame (202) by the respective candidate vector to produce a corresponding pixel in a set of displaced frames (206). Each displaced frame (206) is subtracted from the current frame and the resulting difference is rectified and spatially filtered in a respective member of a set of error calculation units (207) to produce a set of errors (208). The errors associated with each candidate vector are compared with each other in a comparison unit (209), which finds the minimum value error and the associated candidate index (210), which is applied to a vector selection unit (211) to select one of the candidate vectors (204) to produce a final 'assigned' output vector (212).

In the cited example, the error calculation units (207) rectify the difference between a pixel in the current frame and a displaced pixel in the previous frame. This difference is known as the "displaced frame difference" or "DFD". The DFD is typically filtered, for example by a linear filter or by one of the improvements described in our co-pending UK patent applications numbered 1206065.3 (Publication No. 2502047) and 1306340.9.

One shortcoming with the above algorithm is that small errors in the magnitude or direction of a candidate vector can lead to a disproportionately large error in the DFD, especially in detailed areas of the picture. Such errors can occur for example when the motion of an object includes a zoom or a rotation, and can lead to failure of the comparison and selection units (209, 211) to find the best candidate motion vector.

Another example of an algorithm that calculates motion vectors is given in B. K. P. Horn and B. G. Schunck, "Determining Optical Flow", MIT Artificial Intelligence Memo no. 572, April 1980. This algorithm makes use of the known relationship between the spatial and temporal gradients of a sequence of images, working in an iterative fashion to estimate a smoothly varying motion vector field from measurements of such gradients. A "vector field" in the context of this description refers to a set of vectors with one vector for each pixel. The algorithm overcomes the problems encountered in the DFD based algorithm described above in the presence of zooms and rotations. However, it has several other shortcomings. One is that it fails when the motion from one frame to the next is greater than the typical pitch of details present in the scene. Another is that it fails at boundaries between differently moving objects, where the gradient property mentioned above breaks down. The first shortcoming can be addressed by implementing a hierarchical scheme in which the pictures are first analysed at a low sampling rate and the results passed from lower to higher sampling rates in several stages. However, the hierarchical filtering process leads to other problems by blurring the boundaries between moving objects. The second shortcoming can to some extent be addressed by the introduction of robust statistics, for example as described by M. J. Black and P. Anandan in "The robust estimation of multiple motions: parametric and piecewise-smooth flow fields" in Computer Vision and Image Understanding, vol. 63, no. 1 pp 75-104, January 1996.

There is thus a need for improved motion vector processing that delivers more accurate vectors in the presence of complex motion and object boundaries.

SUMMARY OF THE INVENTION

It is an object of the present invention to provide a method and apparatus for motion estimation involving candidate motion vector generation and assignment, in which pixel-based candidate motion vector fields are refined using a gradient-based method. The invention combines the advantages of an assignment-based method at motion boundaries with the advantages of a gradient-based method in areas of smoothly varying motion such as zooms and rotations.

The invention consists in video motion or displacement estimation methods and apparatus for generating candidate motion vector fields that represent the respective positions of a frame's pixels in a respective reference frame, in which initial candidate vectors are refined, the refinement making use of spatial gradients of pixel values, and the relative contribution of pixels to the refinement process depends on a previously determined vector error.

Advantageously, the contribution of pixels to the refinement process is determined by multiplication by a weight function which is a decreasing function of the vector error. Suitably, the function is a negative exponential function.

In certain embodiments, a motion vector assigned to a pixel in a region in a current frame is refined in dependence upon a combination of a plurality of sets of pixel-value gradient parameters for a respective plurality of pixels at locations in the said region of the current frame.

And, a motion vector assigned to a pixel in a region in a current frame is refined in dependence upon a combination of a plurality of sets of pixel-value gradient parameters for a respective plurality of pixels at locations in the said reference frame defined by motion vectors assigned to pixels in the said region of the current frame.

In a preferred embodiment, for each pixel and for each vector field, horizontal and vertical gradients of a current frame and of a reference frame displaced according to the vector field are taken, sums of products of the gradients, of motion vector components and displaced frame differences are taken to form autocorrelation and cross-correlation signals, those signals are multiplied by weights and filtered by spatial smoothing filters, and the resulting smoothed weighted correlation signals are combined by taking quotients of sums of products to produce refined motion vectors.

Advantageously, initial candidate motion vectors are derived from motion estimation applied to overlapping rectangular image blocks, with an overlap structure such that each pixel not close to the picture edges occupies four regions; and, an assignment process allocates refined vectors to pixels in dependence on respective error values for the refined vectors.

BRIEF DESCRIPTION OF THE DRAWINGS

An example of the invention will now be described with reference to the drawings in which.

DETAILED DESCRIPTION OF THE INVENTION

Figure 1:
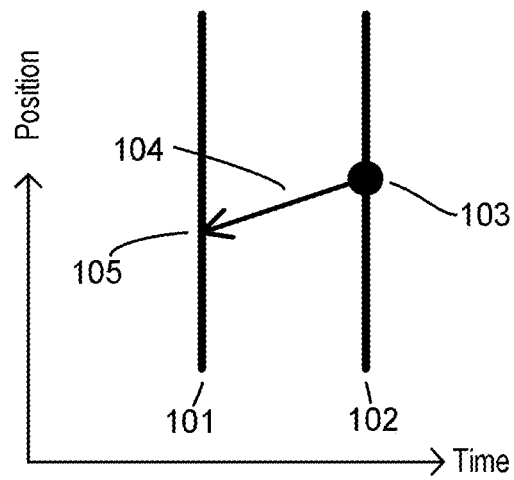
FIG. 1 is a diagram showing current and previous frames in an image sequence and a backward motion vector extending from a pixel in the current frame.
Figure 2:
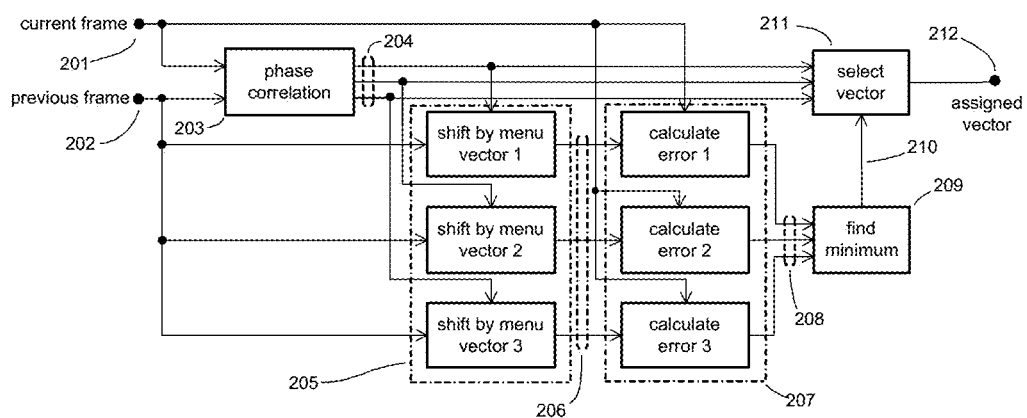
FIG. 2 is a block diagram of apparatus for assigning backward motion vectors to pixels according to the prior art.
Figure 3:
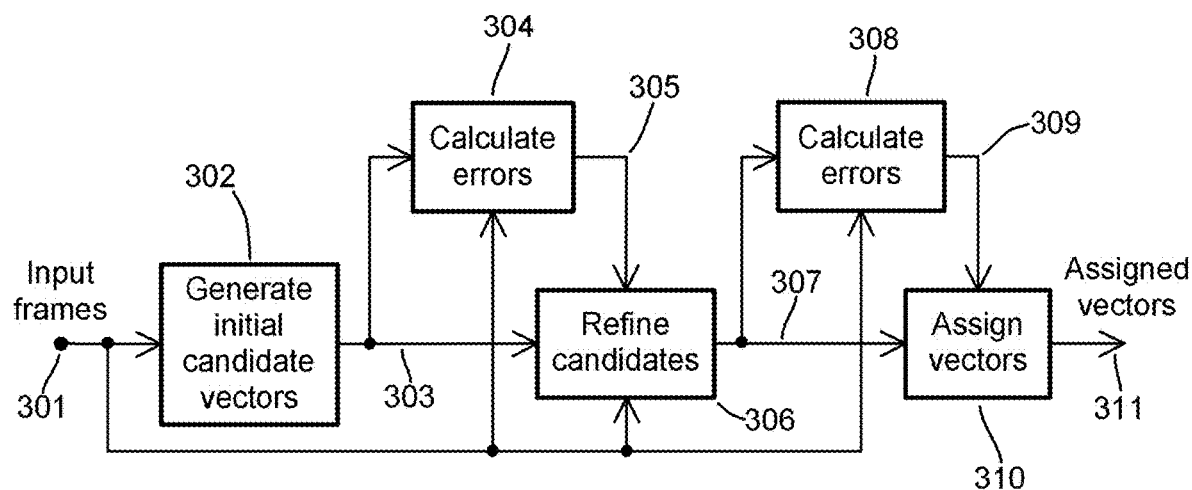
FIG. 3 is a block diagram of a motion estimator incorporating the invention.

A motion estimator incorporating the invention will now be described. Referring to FIG. 3, input picture information (301) spanning at least two time-sequential video frames is applied to a known motion generator (302) of initial motion vector candidates (303). The generator may consist, for example, of a phase correlator operating on large overlapping blocks of the picture, followed by a peak finder which analyses the correlation surface at the output of the phase correlator to find a number of distinct peaks representing candidate motion vectors. Suitable block dimensions are 64×64 pixels, with an overlap of 32 pixels, which means that each input pixel occupies four overlapping blocks, with the possible exception of pixels near to the edges of the picture. A suitable number of peaks is 2, which means in this case that every pixel is associated with 8 initial candidate vectors, and that those 8 vectors will be constant over each 32×32 region of the picture.

The input picture information (301) and initial candidate vectors (303) are applied to a known first error calculation circuit (304) which calculates for each pixel a set of errors (305), one for each candidate vector. The error calculation circuit may be a filtered displaced frame difference (DFD) generator according to the prior art discussed in the "Background" section above. For the purpose of this description, the error will henceforth be referred to as the "filtered DFD" while not precluding the use of other suitable error measures. The filtered DFDs (305), the initial candidates (303) and the input picture information (301) are applied to a candidate vector refinement circuit (306) according to the invention, which will be described in more detail below. The output (307) of the candidate vector refinement circuit (306) is a set of refined candidate vectors for each pixel, with the property that each candidate in the set is no longer constant over a region but can vary, typically smoothly, from one pixel to another.

The refined candidates (307) and the input picture information (301) are applied to a known second error calculation circuit (308) which operates in identical manner to the first error calculation circuit (304) to calculate filtered DFDs (309) corresponding to the refined candidate vectors (307), which are applied to a known vector assignment circuit (310) to calculate a final assigned vector (311) for each pixel. Typically the vector with the lowest filtered DFD will be chosen for each pixel, but other factors such as acceleration may be taken into account at this point, for example as described in UK patent application 1206067.9.

The DFD for a pixel in a current frame and an associated motion vector is the difference between the value of that pixel and the value of a pixel from an earlier or later frame whose spatial position relative to the position of the current frame pixel is defined by the motion vector. The value of the DFD will be proportional both to the spatial image gradient at the location of the current pixel and the spatial image gradient at the pixel 'pointed to' by the vector. If the DFD is not zero, and the magnitude and direction of the image gradient are known, it can be inferred that a 'refined' vector 'pointing to' a nearby location along the line of steepest descent, or ascent as appropriate, would give rise to a smaller DFD. If gradient values at a number of nearby positions are available it should be possible to determine an optimum magnitude and direction for the refined vector. The refined vector has two advantages, it more accurately describes the motion between frames; and, particularly importantly, it gives rise to a smaller DFD, which is better able to distinguish the refined vector from inferior vectors in an assignment process.

The candidate vector refinement circuit (306) according to the invention operates according to the above principle and will now be described. The circuit processes the candidate vectors applicable to pixels to derive refined vectors applicable to those pixels. The processing makes use of the pixel values of the current image, and the pixel values of the appropriate earlier or later shifted image shifted by each vector. The process also receives a weight value applicable to each vector that is derived from the error value for the respective vector.

First, the gradient-based refinement of an initial vector for a single pixel will be described mathematically; and then, a system according to an embodiment of the invention, in which gradient information from a small image region is combined, will be described with reference to FIG. 4.

For every pixel in the current frame we calculate the following quantities:

Horizontal gradient $g_{1x}$
Vertical gradient $g_{1y}$
Squared horizontal gradient $g_{1xx} = g_{1x}^2$
Squared vertical gradient $g_{1yy} = g_{1y}^2$
Gradient product $g_{1xy} = g_{1x} g_{1y}$ We also calculate the equivalent quantities for every pixel in the displaced reference frame: $g_{2x}$, $g_{2y}$, $g_{2xx}$, $g_{2yy}$, $g_{2xy}$.

We then form the sums of the five pairs of quantities:

$g_x = g_{1x} + g_{2x}$
$g_y = g_{1y} + g_{2y}$
$g_{xx} = g_{1xx} + g_{2xx}$
$g_{yy} = g_{1yy} + g_{2yy}$
$g_{xy} = g_{1xy} + g_{2xy}$

The above combined gradient parameters are combined with the horizontal and vertical components $v_x$ and $v_y$ of the relevant motion vector to give five motion vector correlation values as follows:

Horizontal cross-correlation $C_x = g_{xx} v_x + g_{xy} v_y + g_x d$
Vertical cross-correlation $C_y = g_{xy} v_x + g_{yy} v_y + g_y d$
Horizontal auto-correlation $A_{xx} = g_{xx} + 1/50$
Vertical auto-correlation $A_{yy} = g_{yy} + 1/50$
Joint auto-correlation $A_{xy} = g_{xy}$ Note that the constant 1/50 is appropriate for 8-bit luminance values and will be recognised by skilled mathematicians as a regularisation parameter.

The components of the refined vector are given by the following equations:

$$v_x = \frac{A_{yy}.C_x - A_{xy}.C_y}{k}$$

$$v_y = \frac{A_{xx}.C_y - A_{xy}.C_x}{k}$$

Where $k = A_{xx} \cdot A_{yy} - A_{xy}^2$

An embodiment of the novel vector refinement process will now be described with reference to the block diagram of FIG. 4. A current-frame signal (401) and a displaced reference-frame signal (402) are subtracted (403) to produce an (unfiltered) displaced frame difference or DFD (404). The current-frame signal (401) is also applied to a horizontal gradient calculation circuit (405) to produce a current-frame horizontal gradient signal $g_{1x}$ (406) and to a vertical gradient calculation circuit (407) to produce a current-frame vertical gradient signal $g_{1y}$ (408). A suitable gradient calculation circuit calculates the difference between samples on either side of the current sample. Similarly, the reference-frame signal (402) is also applied to a horizontal gradient calculation circuit (409) to produce a reference-frame horizontal gradient signal $g_{2x}$ (410) and to a vertical gradient calculation circuit (411) to produce a reference-frame vertical gradient signal $g_{2y}$ (412).

The four gradient signals (406, 408, 410, 412) are applied to squaring circuits (413, 415, 417, 419) to produce respective squared gradient signals $g_{1xx}$ (414), $g_{1yy}$ (416), $g_{2xx}$ (418), and $g_{2yy}$ (420). The current-frame horizontal and vertical gradient signals (406, 408) are also multiplied together (421) to produce a current-frame gradient product signal $g_{1xy}$ (422). Likewise, the reference-frame horizontal and vertical gradient signals (410, 412) are also multiplied together in multiplier (423) to produce a reference-frame gradient product signal $g_{2xy}$ (424).

The five current-frame signals $g_{1xx}$ (414), $g_{1x}$ (406), $g_{1xy}$ (422), $g_{1y}$ (408) and $g_{1yy}$ (416) are added to the corresponding reference-frame signals $g_{2xx}$ (418), $g_{2x}$ (410), $g_{2xy}$ (424), $g_{1y}$ (412) and $g_{2yy}$ (420) in adders (425, 427, 429, 431, 433) to produce combined gradient signals $g_{xx}$ (426), $g_x$ (428), $g_{xy}$ (430), $g_y$ (432) and $g_{1yy}$ (434).

The combined horizontal squared-gradient signal $g_{xx}$ (426) is added (435) to a small regularisation constant to produce a horizontal auto-correlation signal $A_h$ (436). Likewise, the combined vertical squared-gradient signal $g_{yy}$ (434) is added (437) to a small regularisation constant to produce a vertical auto-correlation signal $A_v$ (438).

A horizontal cross-correlation signal $X_h$ is calculated as follows. The combined horizontal squared-gradient signal $g_{xx}$ (426) and the horizontal component of the corresponding candidate vector (439) are multiplied together (441) to produce a first product term (442). The combined horizontal gradient signal $g_x$ (428) and the DFD (404) are multiplied together (449) to produce a second product term (450). The combined gradient product signal $g_{xy}$ (430) and the vertical component of the corresponding candidate vector (440) are multiplied together (445) to produce a third product term (446). The three product terms (442, 450, and 446) are added together (453) to produce the horizontal cross-correlation signal $X_h$ (454).

Similarly, a vertical cross-correlation signal $X_v$ is calculated as follows. The combined vertical squared-gradient signal $g_{yy}$ (434) and the vertical component of the corresponding candidate vector (440) are multiplied together (447) to produce a first product term (448). The combined vertical gradient signal $g_y$ (432) and the DFD (404) are multiplied together (451) to produce a second product term (452). The combined gradient product signal $g_{xy}$ (430) and the horizontal component of the corresponding candidate vector (439) are multiplied together (443) to produce a third product term (444). The three product terms (448, 452, and 444) are added together (455) to produce the vertical cross-correlation signal $X_v$ (456).

Finally, the combined gradient product signal $g_{xy}$ (430) is interpreted without further processing as a joint auto-correlation signal $A_{hv}$.

The five gradient correlation parameters:
Horizontal cross-correlation $X_h$ (454);
Vertical cross-correlation $X_v$ (456);
Horizontal auto-correlation $A_h$ (436);
Vertical auto-correlation $A_v$ (438); and,
Joint auto-correlation $A_{hv}$ (430)

could be used to evaluate a refined vector according to principle described above. However, in the invention, the sets of five gradient correlation parameters applicable to a set of neighbouring pixels are respectively combined into five weighted sums in five filters. The weight applied to each set depends on the motion vector error value for the respective pixel.

The five autocorrelation and cross-correlation signals are separately multiplied by the corresponding weighting signal (499) (described below) in multipliers (457, 459, 461, 463 and 465) to produce weighted correlation signals (458, 460, 462, 464 and 466) which in turn are separately filtered by spatial averaging filters (467, 469, 471, 473 and 475) to produce filtered correlation signals (468, 470, 472, 474 and 476).

A suitable spatial averaging filter is a 21×21 running-average filter, so that correlation parameters are combined for a set of 441 neighbouring pixels. Other filters may be used; for example the filter itself may apply a weight to the data for a pixel that depends on the position of that pixel within the set of neighbouring pixels.

The outputs from the five filters are used to calculate the horizontal and vertical components of a refined vector. A denominator signal, corresponding to the value k in the above mathematical description, is calculated as follows. The filtered horizontal auto-correlation signal (468) and the filtered vertical auto-correlation signal (476) are multiplied together (481) to form a first denominator term (482). The filtered joint autocorrelation signal (483) is squared (483) to form a second denominator term (484) which is subtracted (491) from the first denominator term (482) to produce a denominator signal (492).

A horizontal numerator signal is calculated as follows. The filtered vertical autocorrelation signal (476) and the filtered horizontal cross-correlation signal (470) are multiplied together (477) to produce a first horizontal numerator term (478). The filtered joint autocorrelation signal (472) and the filtered vertical cross-correlation signal (474) are multiplied together (479) to produce a second horizontal numerator term (480). The two horizontal numerator terms (478 and 480) are subtracted (489) to form a horizontal numerator signal (490).

Similarly, a vertical numerator signal is calculated as follows. The filtered horizontal autocorrelation signal (468) and the filtered vertical cross-correlation signal (474) are multiplied together (487) to produce a first vertical numerator term (488). The filtered joint autocorrelation signal (472) and the filtered horizontal cross-correlation signal (470) are multiplied together (485) to produce a second vertical numerator term (486). The two vertical numerator terms (488 and 486) are subtracted (493) to form a horizontal numerator signal (494).

Finally, a refined horizontal motion vector component (496) is calculated by taking the quotient (495) of the horizontal numerator signal (490) and the denominator signal (492), and a refined vertical motion vector component (498) is calculated by taking the quotient (497) of the vertical numerator signal (494) and the denominator signal (492).

The calculation of refined motion vectors just described needs to be performed for every candidate motion vector for every pixel. However, some parts of the calculation—those that make use of only the pixel values of the current frame—can be performed in common and stored for all candidate motion vectors. The calculations concerned are those performed by blocks 405, 407, 413, 415 and 421.

The calculation of the input weight signal (499) will now be described. It is a decreasing function of the error signal identified as the output (305) of the first error calculation circuit (304). A suitable function is as follows:

$$w = e^{-\frac{h}{30}}$$

where w is the desired weight and h is the error signal.

Figure 4:
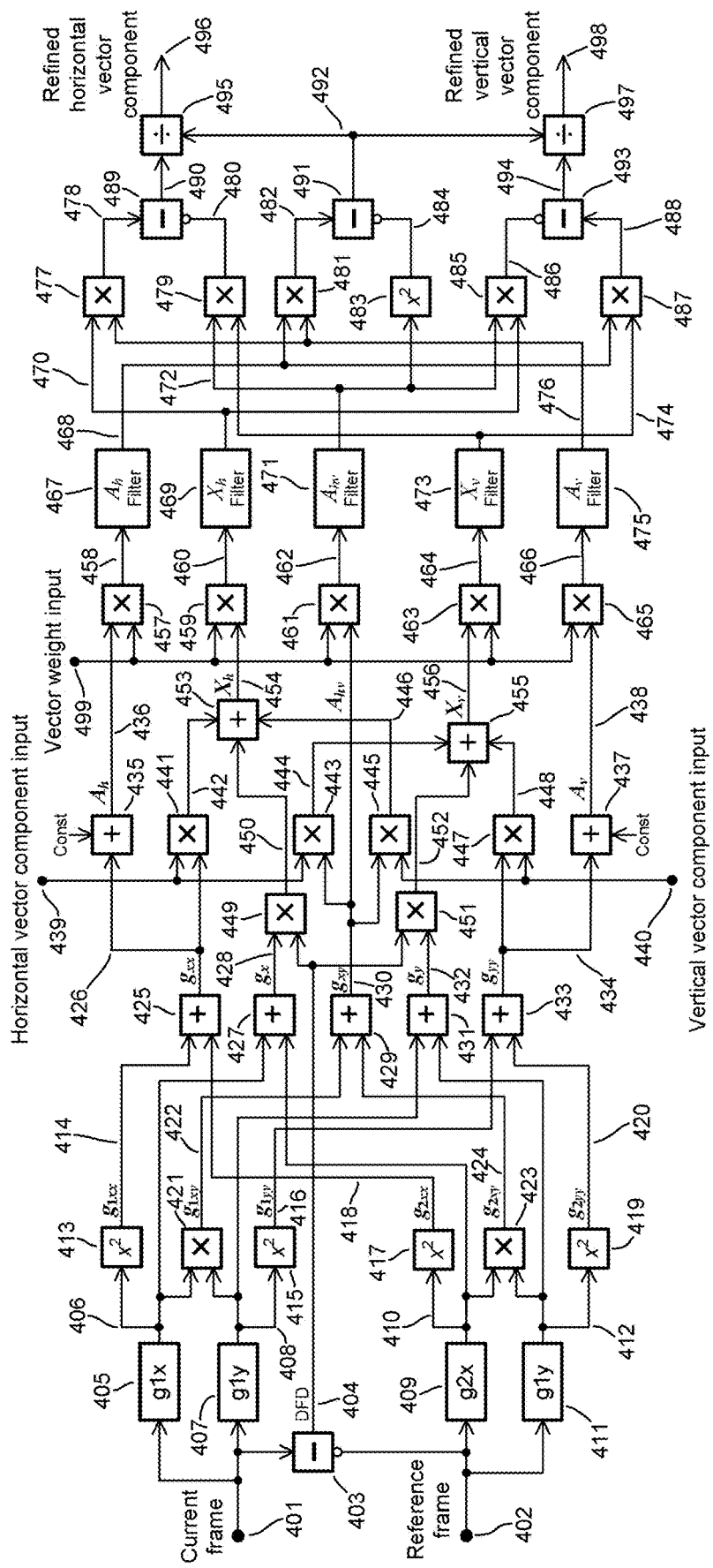
FIG. 4 is a block diagram of a candidate motion vector refinement circuit according to the invention.

The system of FIG. 4 thus derives refined output vector components (496, 498) from the components (439, 440) of each input vector. As explained, the process operates on every pixel and all its associated vectors. Particular input vectors may apply to individual pixels, groups of pixels in an image region, or to the whole frame. Typically, input vectors from the motion measurement process will be constant over some region of the frame and the refined output vectors will vary. However, the input vectors could comprise a varying vector field—possibly from a previous process according to the invention.

An informal explanation of the advantages of the vector refinement system according to the invention will now be given. The use of gradient based motion estimation works well in the case of vector refinement because the changes to the motion vectors are expected to be small, so there is no need for the hierarchical prior art approach discussed in the Background section. However, there is a potential problem in the use of gradient refinement because it relies on processing a smoothly varying vector field.

The system of the invention avoids this problem by refining a vector according to a weighted combination of gradient parameters, where the weight depends on an error value for the vector that is being refined. The invention also is particularly suitable for use in a system where the final vector assignment involves a choice between motion vectors that were originally derived from different, overlapping blocks of pixels. Both these aspects enable the problem of motion estimation at boundaries between differently moving image regions to be solved as will now be explained.

Figure 5:
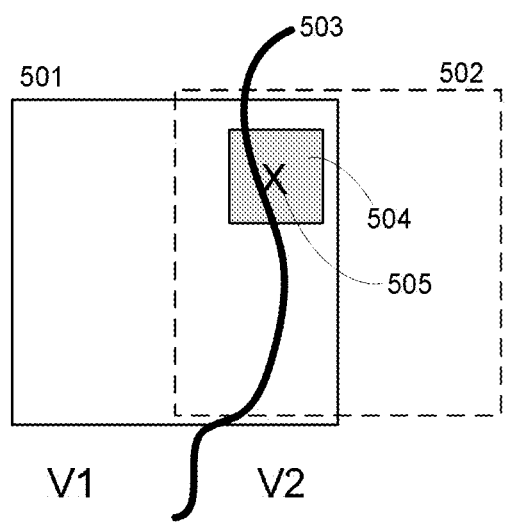
FIG. 5 is an illustration of the operation of the invention at a motion boundary.

An example of the operation of the inventive process is given in FIG. 5. Two horizontally overlapping blocks (501, 502) are shown. For clarity, a small vertical offset is shown between the blocks. A boundary (503) between two different moving objects is shown. The motions of the objects to the left and right of the boundary are correctly described by smoothly varying motion vector fields labelled V1 and V2 respectively.

The candidate vector outputs from a typical block-based motion measurement process would be a constant vector, dominated by the average of V1, for the block (501); and a constant vector, dominated by the average of V2, for the block (502). Neither of these vectors will be particularly accurate because both blocks include two, differently-moving objects.

Filtered DFDs calculated using the constant candidate motion vectors for the block (501) will be fairly low for pixels to the left of the boundary (503), and will be higher for the right portion of the block. Similarly, the filtered DFDs calculated from the constant vector for the block (502) will be lower to the right of the boundary (503), and higher to the left of it.

In the system of FIG. 4, these DFDs are used to derive the weights that are applied to the correlation parameters for respective vectors when they are spatially averaged in the filters (467, 469, 471, 473 and 475) of the refinement process. When refining vectors applicable to the pixel (505) the extent of the spatial averaging filters is as shown by the rectangle (504). Although the filters span the boundary (503), the contributions relating to the right hand side of the boundary (503) will be given greater weight when refining vectors applicable to the pixel (505). This applies equally to the vectors derived from the block (501) as for the vectors derived from the block (502).

At the vector assignment stage, when a decision is made between vectors belonging to V1 and those belonging to V2, pixels close to the edge (503) will have reliable refined candidates from both objects from which to make a final decision. Similar arguments will show that multiple moving objects within a block can be handled by starting from multiple vectors for each block.

Individual aspects of the process may be varied without departing from the scope of the invention. For example, the initial generator of candidate vectors may produce a varying, rather than a constant, initial vector field. In its most general form, therefore, both the input and output of the process are sets of vector fields. It follows that the inventive process may be applied in an iterative fashion, generating successive improvements to the set of candidate vector fields. In a software embodiment of the invention, there is a trade-off between processing time and quality, and this may be controlled by observing the changes in the average filtered DFDs at each iteration.

The above description has been given in terms of motion measurement between successive frames in a time sequence, although these have been described a frames in some applications the temporal image samples may be fields. The invention may equally be applied to the measurement of displacement between multiple images which need not necessarily be associated with different times, but which may be taken from cameras in different positions, for example in a 3-D or multiview production system.

The invention claimed is:

1. A video motion estimation method, comprising:
dividing a frame into blocks of pixels;
generating for each block at least one initial candidate vector to represent a respective position of the pixels of the block in a respective reference frame, wherein each initial candidate vector is common to all pixels in the block;
determining separately for each pixel a vector error representing an error in the respective initial candidate vector that represents the position of the respective pixel in the reference frame;
determining spatial gradients of pixel values;
multiplying the spatial gradients of pixel values by a weight function that is a decreasing function which is a negative exponential of the determined vector error for each pixel to determine spatial gradient contributions for said respective pixel;
deriving refined candidate vectors by refining each initial candidate vector at each respective pixel with said spatial gradient contributions determined for said respective pixel; and
separately assigning respective refined candidate vectors to each pixel to estimate pixel motion of each respective pixel of each block.

2. A method according to claim 1, further comprising determining a first spatial gradient at the position of the pixel in the frame and a second spatial gradient at the location in the reference frame for that pixel as represented by the initial candidate vector.

3. A method according to claim 1, further comprising refining the initial candidate vector at a pixel in a region in the frame in dependence upon a combination of a plurality of sets of pixel-value gradient parameters for the respective plurality of pixels at positions in the said region of the frame.

4. A method according to claim 1, further comprising refining the initial candidate vector assigned at a pixel in a region in the frame in dependence upon a combination of a plurality of sets of pixel-value gradient parameters for the respective plurality of pixels at positions in the said reference frame defined by initial candidate vectors assigned to pixels in the said region of the frame.

5. A method according to claim 1, further comprising:
for each pixel and for each initial candidate vector, providing horizontal and vertical gradients of the frame and of the reference frame displaced according to the respective vector;
providing sums of products of the horizontal and vertical gradients, of horizontal and vertical components of the initial candidate vectors and displaced frame differences to form autocorrelation and cross-correlation signals;
multiplying the provided horizontal and vertical gradients and the provided sums by weights and filtering the resulting products by spatial smoothing filters, and combining the resulting smoothed weighted autocorrelation and cross-correlation signals by taking quotients of sums of products to produce the refined candidate vectors.

6. A method according to claim 1, further comprising:
deriving the initial candidate vectors from motion estimation applied to overlapping rectangular image blocks, with an overlap structure in which each pixel not close to a picture edge occupies four regions; and
allocating, by an assignment process, refined motion vectors to pixels in dependence on respective error values for the refined candidate vectors.

7. A video motion estimation system for generating candidate vectors that represent the respective positions of a frame's pixels in a respective reference frame, the system comprising:
an input configured to receive a frame of a video;
a video processor configured to:
divide the frame into blocks of pixels,
generate for each block at least one initial candidate vector to represent a respective position of the pixels of the block in a respective reference frame,
determine separately for each pixel a respective vector error representing an error in the respective initial candidate vector that represents the position of the respective pixel in the reference frame;
form spatial gradients of pixel values;
multiply the spatial gradients of pixel values by a weight function that is a decreasing function which is a negative exponential of the determined vector error for each pixel to determine spatial gradient contributions for said respective pixel;
derive refined candidate vectors by refining said initial candidate vector in a refinement process at each respective pixel with said spatial gradient contributions determined for said respective pixel; and
separately assign respective refined candidate vectors to each pixel to estimate pixel motion of each respective pixel of each block.

8. A system according to claim 7, wherein the video processor is configured to refine the initial candidate vector at a pixel in a region in the frame in dependence upon a combination of a plurality of sets of pixel-value gradient parameters for the respective plurality of pixels at positions in the said region of the frame.

9. A system according to claim 7, wherein the video processor is configured to refine the initial candidate vector at a pixel in a region in the frame in dependence upon a combination of a plurality of sets of pixel-value gradient parameters for the respective plurality of pixels at positions in the said reference frame defined by initial candidate vectors assigned to pixels in the said region of the frame.

10. A non-transitory computer readable medium containing instructions causing a computer to execute a video motion estimation method, comprising:

dividing a frame into blocks of pixels;
generating for each block at least one initial candidate vector to represent a respective position of the pixels of the block in a respective reference frame, wherein each initial candidate vector is common to all pixels in the block;
determining separately for each pixel a vector error representing an error in the respective initial candidate vector that represents the position of the respective pixel in the reference frame;
determining spatial gradients of pixel values;
multiplying the spatial gradients of pixel values by a weight function that is a decreasing function which is a negative exponential of the determined vector error for each pixel to determine spatial gradient contributions for said respective pixel;
deriving refined candidate vectors by refining each initial candidate vector at each respective pixel with said spatial gradient contributions determined for said respective pixel; and
separately assigning respective refined candidate vectors to each pixel to estimate pixel motion of each respective pixel of each block.

11. A medium according to claim 10, wherein the video motion estimation method executed by the computer further comprises determining a first spatial gradient at the position of the pixel in the frame and a second spatial gradient at the location in the reference frame for that pixel as represented by the initial candidate vector.

12. A medium according to claim 10, wherein the video motion estimation method executed by the computer further comprises refining the initial candidate vector at a pixel in a region in the frame in dependence upon a combination of a plurality of sets of pixel-value gradient parameters for the respective plurality of pixels at positions in the said region of the frame.

13. A medium according to claim 10, wherein the video motion estimation method executed by the computer further comprises refining the initial candidate vector at a pixel in a region in the frame in dependence upon a combination of a plurality of sets of pixel-value gradient parameters for the respective plurality of pixels at positions in the said reference frame defined by initial candidate vectors assigned to pixels in the said region of the frame.

14. A medium according to claim 10, wherein the video motion estimation method executed by the computer further comprises:
for each pixel and for each initial candidate vector, providing horizontal and vertical gradients of the frame and of the reference frame displaced according to the respective vector;
providing sums of products of the horizontal and vertical gradients, of horizontal and vertical components of the initial candidate vectors and displaced frame differences to form autocorrelation and cross-correlation signals;
multiplying the provided horizontal and vertical gradients and the provided sums by weights and filtering the resulting products by spatial smoothing filters, and combining the resulting smoothed weighted autocorrelation and cross-correlation signals by taking quotients of sums of products to produce the refined motion vectors.

15. A medium according to claim 10, wherein the video motion estimation method executed by the computer further comprises:
deriving the initial candidate vectors from motion estimation applied to overlapping rectangular image blocks, with an overlap structure in which each pixel not close to a picture edge occupies four regions; and
allocating, by an assignment process, refined motion vectors to pixels in dependence on respective error values for the refined candidate vectors.

16. A system according to claim 7, wherein the video processor is further configured to:
for each pixel and for each initial candidate vector, provide horizontal and vertical gradients of the frame and of the reference frame displaced according to the respective vector;
provide sums of products of the horizontal and vertical gradients, of horizontal and vertical components of the initial candidate vectors and displaced frame differences to form autocorrelation and cross-correlation signals; and
multiply the provided horizontal and vertical gradients and the provided sums by weights and filtering the resulting products by spatial smoothing filters, and combining the resulting smoothed weighted autocorrelation and cross-correlation signals by taking quotients of sums of products to produce the refined candidate vectors.

* * * * *